Patented Nov. 3, 1942

2,300,683

UNITED STATES PATENT OFFICE 2,300,683

FIREBRICK

John F. McClaskey, Pittsburgh, Pa.

No Drawing. Application March 1, 1941,
Serial No. 381,387

4 Claims. (Cl. 106—44)

This invention relates to improvements in fire bricks and in the process of manufacturing the latter, and contemplates among its more important objects and advantages to provide improved fire bricks of the character described, which are formed and dried or cured, laid up in that condition and burned in place in furnaces or other structures exposed to extreme heat and requiring refractory linings, which have great ruggedness and ample strength, prior to firing, to withstand with reasonable care, the transportation and ordinary handling thereof, which are capable of withstanding to a marked degree the chemical or physical erosive actions of molten metals and of common types of metallurgical slags, which embody desirable characteristics, such as crushing strength, modulus of rupture, and resistance to load at high temperatures, which do not undergo substantial volume change in burning and reheating and consequently have minimum coefficients of expansion and contraction, which are durable and highly efficient in their use, and comparatively economical in their manufacture.

In making a brick possessing the qualities above referred to, the following ingredients, compounded by volume in approximately the proportions mentioned, are employed: Either flint clay, plastic clay, or silica, or a combination of any two or of all depending on the refractory properties of the product to be established, ninety percent. Alumina, iron, graphite, carborundum, and magnesite or chrome either or both contingent on the purposes for which the product is to be employed, each in approximately equal proportions to combinedly constitute ten percent of the compound.

It is, however, understood that a reasonable latitude in the proportionate amounts of the mentioned ingredients may be allowed without appreciably affecting the refractory and other desirable properties of the improved brick.

In the process of manufacture of the bricks, the constituents of the compound are crushed and ground in correlated pulverized size, so that the refractory formed thereof has maximum density, and are then thoroughly mixed or mingled by agitation. A solution, consisting approximately of equal parts of strong salt brine and lignum liquors, is added to the pulverized mix in a sufficient quantity to form a plastic mass of the proper consistency. The plastic mass is fed to any suitable type of molding apparatus and thereby formed into bricks under pressure of approximately two thousand pounds per square inch, more or less.

The formed bricks are subjected to a curing process, which simply consists in storing same in a dry location fully exposed to the atmosphere for a period of approximately six weeks, more or less.

Bricks, constructed of the ingredients and by the method herein set forth, are transformed rapidly into dense, hard, refractory integral bodies, which are ideal for the ultimate purpose of the invention in providing fire bricks that may be handled, shipped, and laid up in the work in furnaces in the unburned condition. It is obvious that great economy is effected in the manufacture of the improved bricks, as the necessity of constructing and operation of expensive kilns, for burning the product at the brick plant or factory is entirely eliminated in the manufacture of the improved bricks.

The improved bricks are intended to be burned by the initial firing operation of the furnace in which they are laid in unburned condition to provide the required refractory lining in the usual manner well known in the art to which the invention appertains. As the temperature of the furnace gradually increases, the fusible constituents of the brick structure will sinter or fuse in the sequence of their fusibility to texturally combine all of the ingredients by pyrochemical action, and thereby provide a composite lining structure of exceptional ruggedness and of superior refractory properties.

Refractory bricks, made from the stated ingredients and in accordance with process set forth, are hard and tough in texture, will not be eroded or otherwise disintegrated by molten metals and slags, and form an ideal refractory as it will not crack, spawl, otherwise disintegrate under furnace heat or in attained temperatures many degrees higher than those ordinarily employed in standard metallurgical operations.

What I claim is:

1. A refractory brick comprising substantially about 90 percent clay, and alumina, iron, graphite and carborundum in about equal proportions.

2. A refractory brick comprising substantially about 90 percent clay, and alumina, graphite, iron, carborundum, and magnesite in about equal proportions.

3. A refractory brick comprising substantially of from about 80 to 90 percent clay, and alumina, iron, graphite, carborundum, and chrome in about equal amounts.

4. A refractory brick comprising substantially of from about 80 to 90 percent clay, and alumina, iron, graphite, carborundum, magnesite, and chrome in about equal proportions.

JOHN F. McCLASKEY.